No. 765,323. PATENTED JULY 19, 1904.
R. ROBINSON.
REFINING FURNACE.
APPLICATION FILED DEC. 11, 1903.
NO MODEL. 3 SHEETS—SHEET 1.
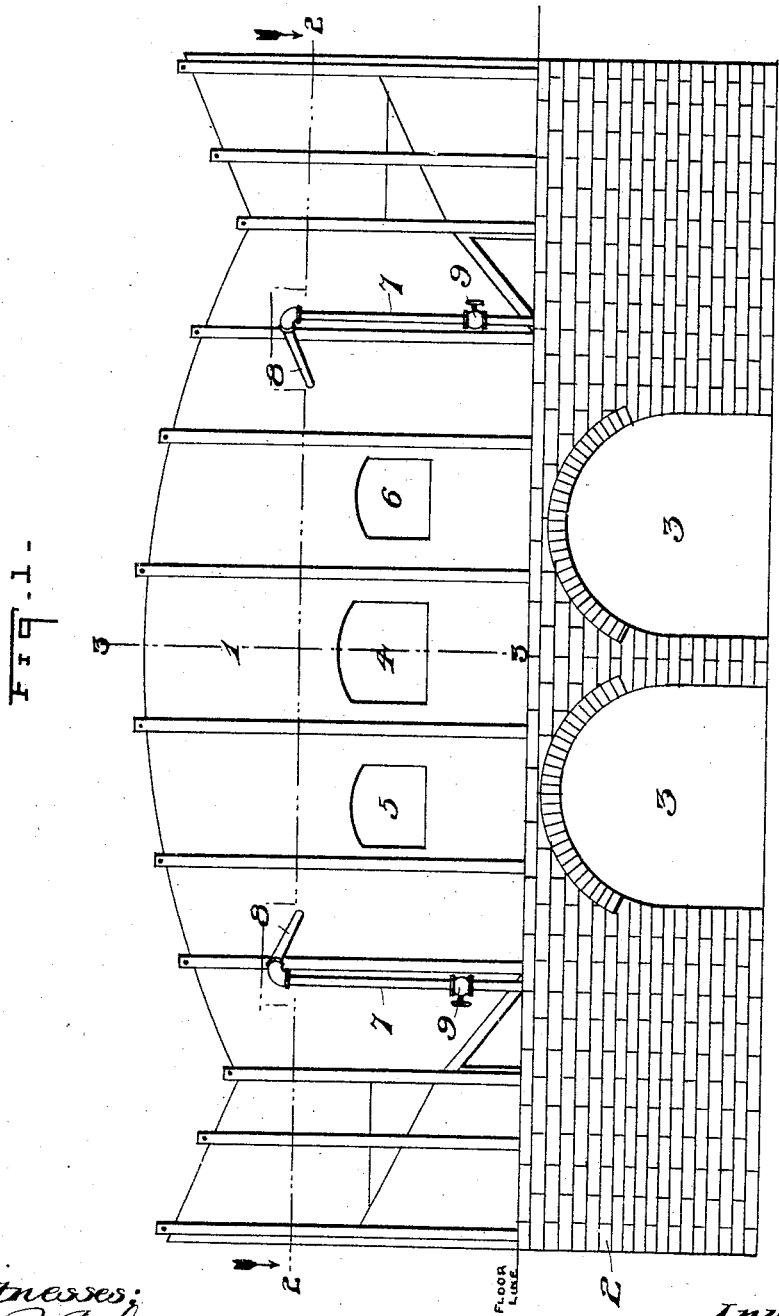

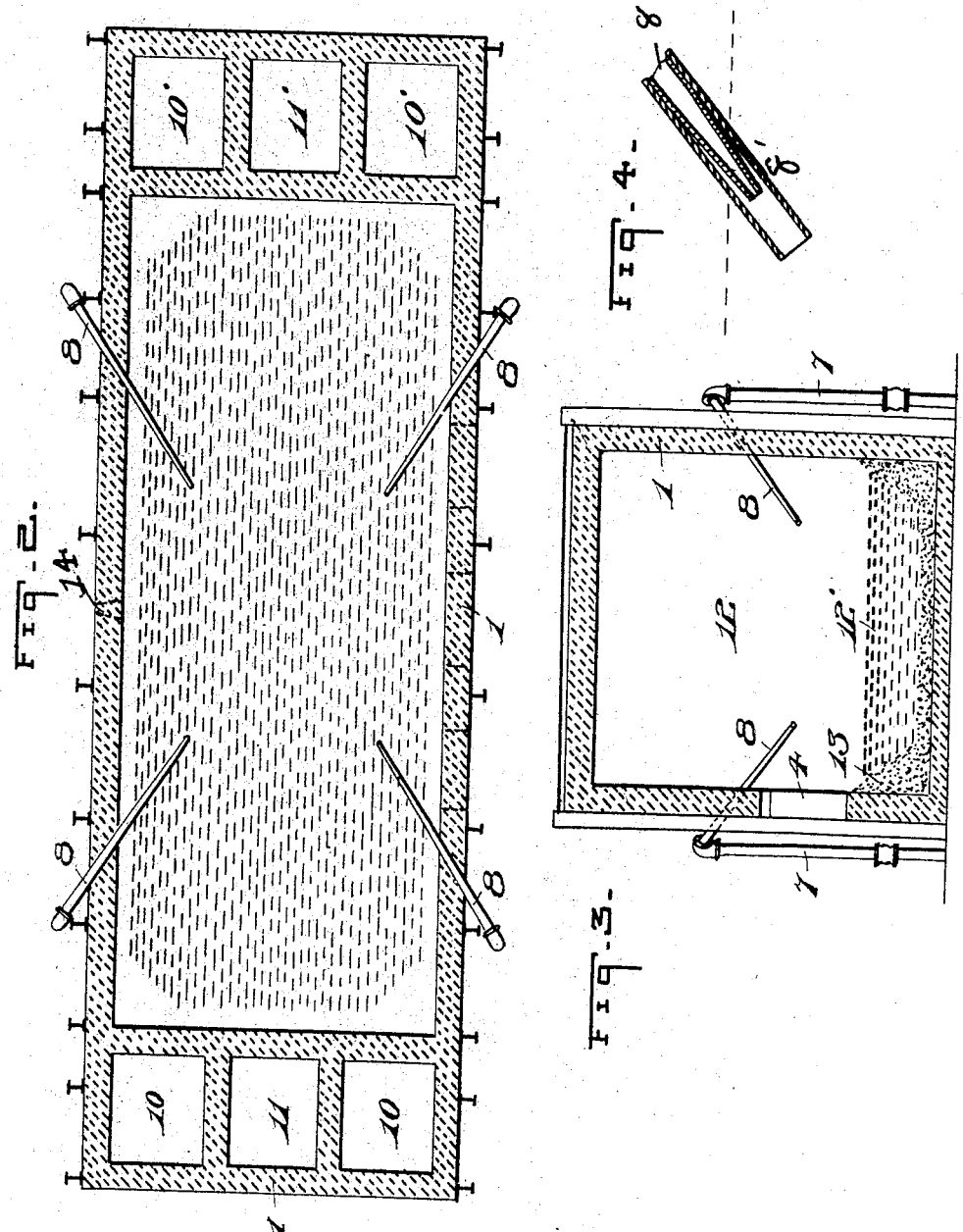

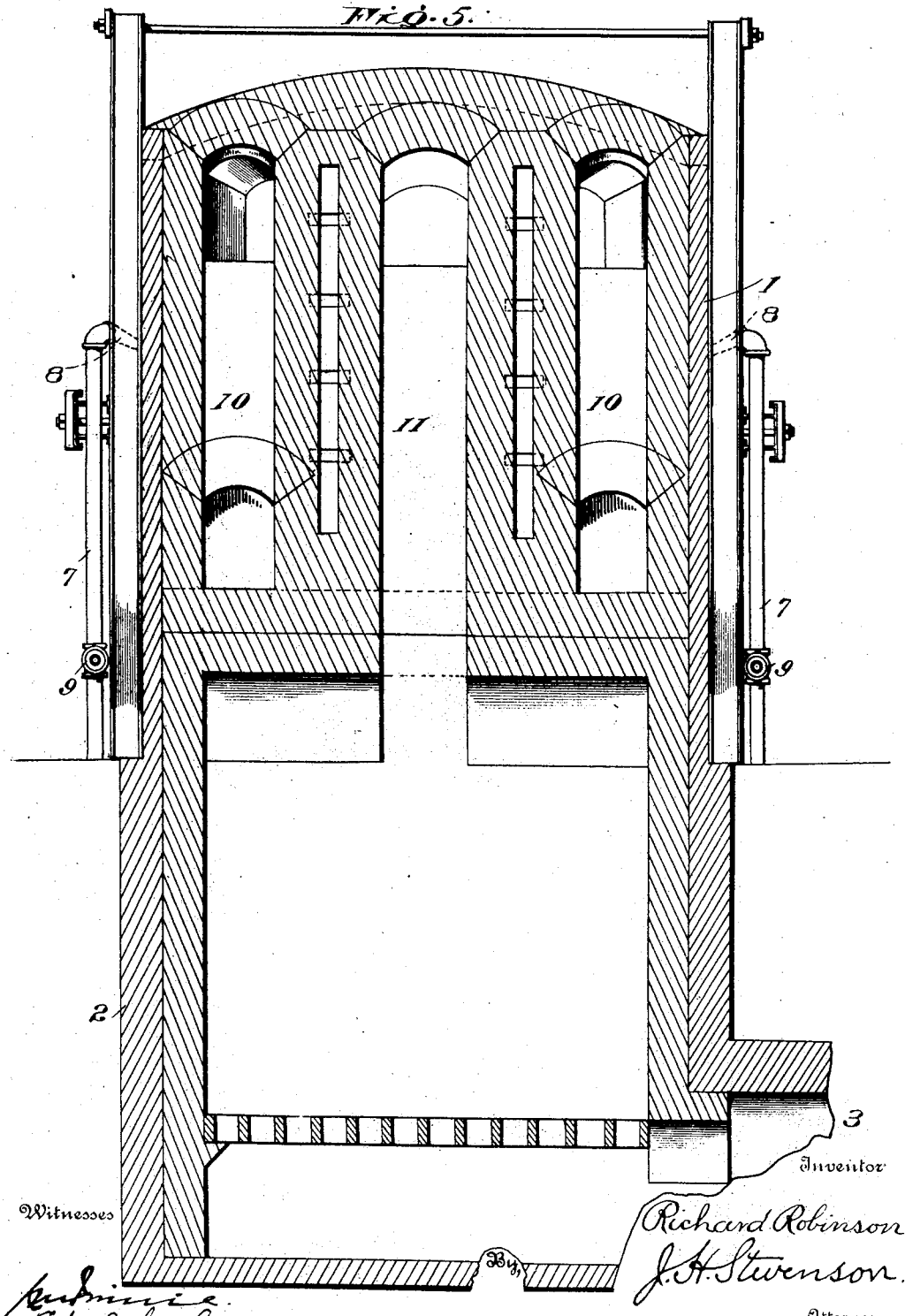

No. 765,323.

Patented July 19, 1904.

UNITED STATES PATENT OFFICE.

RICHARD ROBINSON, OF PITTSBURG, PENNSYLVANIA, ASSIGNOR OF TWO-THIRDS TO THE CHARLES E. BROWN COMPANY.

REFINING-FURNACE.

SPECIFICATION forming part of Letters Patent No. 765,323, dated July 19, 1904.

Application filed December 11, 1903. Serial No. 184,727. (No model.)

*To all whom it may concern:*

Be it known that I, RICHARD ROBINSON, a citizen of the United States, residing at Pittsburg, in the county of Allegheny and State of Pennsylvania, have invented certain new and useful Improvements in Refining-Furnaces, of which the following is a specification.

My invention relates to that class of puddling, open-hearth, boiling, or any kind of a smelting-furnace wherein a purification of metals is effected by the introduction into the molten metal of a forced blast of steam, gas, air, or any combination of the same for the purpose of eliminating the impurities therein, as will be more fully described hereinafter.

In the accompanying drawings, in two sheets, forming a part of this specification, I have illustrated my invention by several views, in which Figure 1 is a front elevation of a furnace having my improvement attached thereto. Fig. 2 is a cross horizontal sectional view taken on the line 2 2 of Fig. 1. Fig. 3 is a sectional view of the furnace, taken on the line 3 3 of Fig. 1. Fig. 4 is a sectional view of one of the twyers used in my invention. Fig. 5 is a vertical section of the furnace, showing the draft-stacks and flame-conducting flues.

In this description the numerals of reference in each figure represent corresponding parts throughout the several views, in which the numeral 1 is the body or exterior walls of the furnace constructed in the usual form and material.

2 is the foundation, and 3 3 are passage-ways to the under side of the furnace.

4, 5, and 6 are the charging-doors of the furnace.

7 and 8 are the pipes that convey the gas, air, steam, or any combination of the same to the melting-chamber 12 of the furnace.

8' represents the twyers, that are introduced into the molten mass of metal.

9 9 are regulating-cocks on the stand-pipes 7.

10 and 10' are the stack-flues, from which the melting-flame is alternately introduced into the chamber 12.

11 and 11' are draft-stacks to carry off the impurities and spent gases from the melting-chamber.

12' is a body of molten metal, and 13 is the sand bed, on which the said metal rests.

14 is the tapping-hole.

In the construction of my melting and refining furnace I place, as will be seen by reference to Fig. 2, three flues at each end of the furnace, the two outer ones being for the introduction of flame, by which the ores in the melting-chamber 12 are reduced to a molten state, and the center ones being the openings leading to the draft-stacks for carrying off waste heat and spent gases. When thus constructed and effectively heated by the usual processes and the ores reduced to a molten state, it becomes necessary to agitate the mass in order to burn up and destroy all impurities in the metal, such as silicia, phosphorus, sulfur, carbon, &c. To accomplish this result in an effective and satisfactory manner, I employ the means shown in Fig. 2 of the drawings, which consists in arranging two upright stand-pipes on each side of the furnace having nozzle-shaped extension-pipes 8, pointing toward the center of the melting-chamber. Arranged on each one of these nozzle-shaped pipes are adjustable twyers, that when in use are lowered into the molten mass of metal, and a forced draft of air and gas mixed, or steam and gas and air combined, or either one singly, is introduced through the stand-pipes and twyers, thus agitating and stirring up the molten mass of metal in such a manner that all parts of the body of metal will be brought into contact with the flame, the impurities aforesaid being burned up and destroyed or else carried off from the melting-chamber through the draft-stacks 11 and 11'.

By arranging the four stand-pipes as shown and described and concentrating the full force of forced draft through the nozzle-shaped extension-pipes and through the twyers into the center of the molten mass of metal a much greater and more effective result can be accomplished than by any of the processes now in use.

The quantity of air or gas or steam or any combination of the same necessary to thoroughly agitate the molten metal is regulated by the stop-cocks 9, located in the upright stand-pipes 7.

Having thus fully shown and described my invention, what I claim as new, and desire to secure by Letters Patent, is—

In a furnace for refining iron and steel, the combination with a melting-chamber, a series of flues arranged at each end of the melting-chamber within the body of the furnace, the central one of said flues being in communication with draft-stacks for carrying out waste gases, and a pair of flues arranged one at either side of the central flue in each of these series of flues adapted to introduce flame to the melting-chamber, stand-pipes having controlling-valves therein arranged exteriorly and adjacent to the melting-chamber, nozzle-forming extensions formed on said pipes and converging toward a common point within the chamber, the said extensions being provided with twyers for introducing a draft into the melting-chamber, substantially as described.

In testimony whereof I affix my signature in presence of two witnesses.

RICHARD ROBINSON.

Witnesses:
CHAS. E. BROWN,
H. W. STEVENSON.